UNITED STATES PATENT OFFICE.

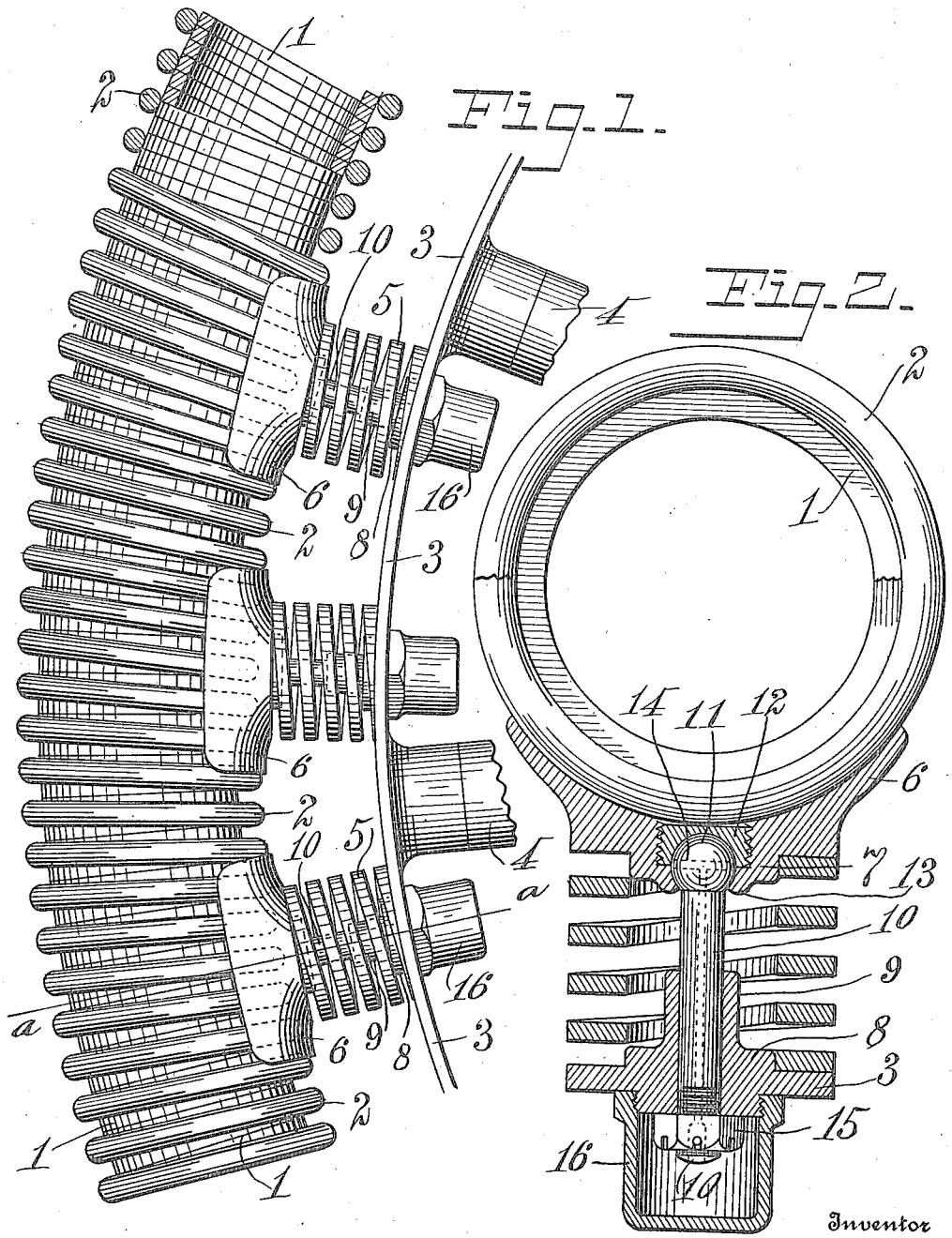

JOHN B. DAVIS, OF TOLEDO, OHIO.

RESILIENT WHEEL.

1,135,994.   Specification of Letters Patent.   Patented Apr. 20, 1915.

Application filed April 11, 1914.   Serial No. 831,307.

*To all whom it may concern:*

Be it known that I, JOHN B. DAVIS, a citizen of the United States, residing at Toledo, in the county of Lucas and State of Ohio, have invented certain new and useful Improvements in Resilient Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automobile wheels and has for its object the provision of means for obtaining the requisite elasticity in the tread of the wheel and the doing away with the use of the usual air cushion or pneumatic tire.

I am aware that repeated efforts have been made to provide such a wheel but heretofore more or less complication has attended such efforts and in many instances a multiplicity of parts have stood in the way of success.

In the present invention it has been my aim to provide means for obtaining the requisite resiliency, mainly in the tread itself, and to otherwise simplify and produce reliable and efficient means for obtaining such resiliency and reduce to the lowest minimum the liability of any disorganization of the parts or breakage or displacement thereof.

In the accompanying drawings, Figure 1 is an elevation of a portion of the rim of the wheel with a part of the inner and outer resilient tread member shown in section; and Fig. 2 is a sectional view of the same on the line *a—a* of Fig. 1.

In the following description relating more specifically to the drawings, similar reference characters indicate the same parts in said drawings.

The tread of the wheel consists of inner and outer coil springs 1 and 2, respectively, the former being constructed of desirable metal substantially rectangular in cross-section and the convolutions of which are closed. The outer coil spring 2, which incloses the inner spring, is preferably constructed of metal which is round in cross-section and the convolutions of which are open, substantially as is shown in the drawings. The ends of these springs may be united in any suitable manner and when so united they each constitute a complete circle one within the other and the common function of both is to provide a desirable resiliency to meet the requirements of such a wheel. The inner tread spring, in addition to contributing to the performance of this common function, also acts to exclude dust or dirt from the interior of the tread by having its convolutions closed, as hereinbefore specified. The additional function of the outer spring 2 is that of an anti-skidding device which is due to the convolutions being more or less separated. As before stated, it is implied that these springs forming the tread of the wheel are constructed of the requisite metal and strength and when so constructed and assembled a wheel tread meeting the requirements above specified is produced. In their formation they are oppositely wound.

3 designates an inner rim with the usual number of spokes 4 extending from the usual hub (not shown). Interposed between the inner rim and the tread of the wheel so consisting of the springs 1 and 2, is a series of coil springs 5 also constructed of suitable metal and preferably flat throughout their convolutions and the convolutions of which are normally open.

6 designates a series of clips the outer surfaces of which are concave in conformity with the transverse curvature of the wheel tread and which form a series of annular seats for said tread. A suitable number of these clips and the springs 5 are employed to form a proper support for the wheel tread throughout its circumference. The inner sides of said clips are provided with bosses 7 which form annular shoulders to support the outer ends of the springs 5. The inner rim 3, at each point where a spring 5 is located, is provided with a boss 8 which provides annular shoulders to receive the inner ends of the springs 5 said boss 8 terminating in a smaller boss 9 through which a bolt 10 passes. The bolts 10 correspond with the number of the springs 5 and clips 6 and each of said bolts is formed with a spherical head 11 on its inner end which is confined within a similar seat formed by a nut 12 and an overhanging portion 13 of the clip so that there is thus provided a ball and socket connected between each of the bolts 10 and the inner rim 3, the nuts 12 being screwed within suitable recesses in said rim and each of said bolts is provided with lubricating channels 14 which are shown in dotted lines and extend to the outer ends of the bolts. Each of said bolts 10 is provided with a nut 15 inclosed by a cap 16 which is screwed to a projecting part of the rim 3 provided for such purposes and these caps provide a series of lubricating chambers for the reception of any suitable lubricant.

Having described my invention, I claim—

In a wheel of the character specified, a tread comprising two endless telescoped coil springs, the convolutions of the outer spring being open, and the inner spring being constructed of wire which is rectangular in cross-section and the convolutions of which are closed, substantially as specified.

In testimony whereof I affix my signature, in presence of two witnesses.

JOHN B. DAVIS.

Witnesses:
AMOR LEAT,
FRANK H. POEPPELMAN.